(12) United States Patent
Pizlo

(10) Patent No.: US 12,259,978 B2
(45) Date of Patent: Mar. 25, 2025

(54) VERIFIABLE MACHINE CODE

(71) Applicant: Apple Inc., Cupertino, CA (US)

(72) Inventor: Filip J. Pizlo, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 288 days.

(21) Appl. No.: 17/694,002

(22) Filed: Mar. 14, 2022

(65) Prior Publication Data

US 2023/0084495 A1 Mar. 16, 2023

Related U.S. Application Data

(60) Provisional application No. 63/243,989, filed on Sep. 14, 2021.

(51) Int. Cl.
*G06F 21/52* (2013.01)
*G06F 21/57* (2013.01)

(52) U.S. Cl.
CPC .............. *G06F 21/57* (2013.01); *G06F 21/52* (2013.01); *G06F 2221/033* (2013.01)

(58) Field of Classification Search
CPC ..... G06F 21/57; G06F 21/52; G06F 2221/033
USPC .......................................................... 726/22
See application file for complete search history.

(56) References Cited

U.S. PATENT DOCUMENTS

| | | | | |
|---|---|---|---|---|
| 6,128,774 | A * | 10/2000 | Necula | G06F 9/44589 717/146 |
| 9,479,398 | B2 * | 10/2016 | Abuelsaad | H04W 12/08 |
| 10,025,691 | B1 * | 7/2018 | Ismael | G06F 21/44 |
| 11,106,801 | B1 * | 8/2021 | Levine | G06F 11/3692 |
| 2007/0285271 | A1 * | 12/2007 | Erlingsson | G06F 21/52 340/815.84 |
| 2010/0058291 | A1 * | 3/2010 | Hahn | G06F 11/3612 717/113 |
| 2015/0012630 | A1 * | 1/2015 | Abuelsaad | G06F 21/121 709/223 |
| 2016/0098562 | A1 * | 4/2016 | Hawblitzel | G06F 8/41 726/22 |

(Continued)

FOREIGN PATENT DOCUMENTS

JP 2019504403 * 2/2019

OTHER PUBLICATIONS

Adita Thakur; Directed Proof Generation for mMachine Code; Springer; Year: 2010; pp. 288-305.*

*Primary Examiner* — Monjur Rahim
(74) *Attorney, Agent, or Firm* — Kilpatrick Townsend & Stockton LLP

(57) ABSTRACT

Aspects and features include a structure for a program directed to a target computing device and metadata that can be used by a verifier in the target computing device. The verifier can quickly and efficiently apply verification rules to identified sections of the program to determine whether the program is safe to execute by the target computing device. In some examples, the target computing device uses the verifier to identify, using the metadata, verifiable sections of instructions that violate execution safety policies. The verifier can apply verification rules to the verifiable sections to determine whether to execute each verifiable section despite instructions in the verifiable section violating execution safety policies. The program and the metadata can be generated, as an example, by a compiler from source code, and transmitted or otherwise distributed to target computing devices.

17 Claims, 7 Drawing Sheets

(56) References Cited

U.S. PATENT DOCUMENTS

2016/0099811 A1* 4/2016 Hawblitzel ............ H04L 9/3268
713/176
2016/0292066 A1* 10/2016 Stevens ............... G06F 11/3624
2021/0390036 A1* 12/2021 Marzec ............... G06F 11/1004

* cited by examiner

VERIFIABLE MACHINE CODE

CROSS-REFERENCE TO RELATED APPLICATION

This application claims the benefit of U.S. Provisional Application No. 63/243,989, filed Sep. 14, 2021, entitled "Verifiable Machine Code." The disclosure of this application is incorporated by reference herein in its entirety.

BACKGROUND

Compiling software is the act of transforming human-readable source code for a computer program into computer-executable machine code. Specialized computer programs called "compilers" can be used to perform this transformation so that software can be developed and coded as source code, while the software can be supplied to users as machine code, which is difficult to understand but efficient to execute. The difficulty of reading and analyzing the emitted machine code raises the possibility of the machine code for a software program that is newly-developed, or recently-modified, being unsafe for execution. For example, the "untrusted" machine code may compromise the function of a target computing device by performing operations that expose private data to capture by unknown parties, or that disrupt the use of memory or other hardware resources by other programs, the operating system, or the processor. Such disruptions can result in errors, freezes, crashes, or the like. It is therefore desirable to provide mechanisms by which untrusted machine code can be verified as safe to execute on a given computing device.

BRIEF SUMMARY

Aspects and features of this disclosure include providing a program for a target computing device and metadata that can be used by a verifier in the target computing device. The metadata is used by the verifier to quickly and efficiently apply verification rules to identified, verifiable sections of the program to determine whether the program is safe to execute by the target computing device.

As an example embodiment, a method includes accessing execution safety policies and verification rules and receiving a program and metadata identifying and describing the at least one verifiable section of instructions within the program whose operation is to be verified. The method further includes identifying, using the metadata, sections of instructions that violate at least one of the execution safety policies. The method further includes, for at least one verifiable section, applying, using the metadata, one or more of the verification rules to the verifiable section of instructions to determine whether to execute the verifiable section despite the instructions in the section violating at least one of the execution safety policies. The method further includes selectively executing the program based on the at least one verifiable section satisfying the verification rules.

In another example embodiment, a method includes generating, from source code, a program configured to be executed by a target computing device and accessing execution safety policies and verification rules applicable to the program. The method further includes identifying at least one verifiable section of instructions within the program that violates at least one of the execution safety policies. The method further includes, for each verifiable section, generating metadata configured for the target computing device to apply one or more of the verification rules to the verifiable section of instructions to determine whether to execute the verifiable section despite violating at least one of the execution safety policies.

Another aspect of the present disclosure includes a system comprising one or more processors and a memory that includes instructions that when executed by the one or more processors, cause the one or more processors to perform one or more methods as described above.

Other aspects of the present disclosure include a non-transitory computer-readable medium, that stores instructions that, when executed by one or more processors, cause the one or more processors to perform one or more methods described above.

A better understanding of the nature and advantages of embodiments of the present disclosure may be gained with reference to the following detailed description and the accompanying drawings.

DETAILED DESCRIPTION

Figure 1:
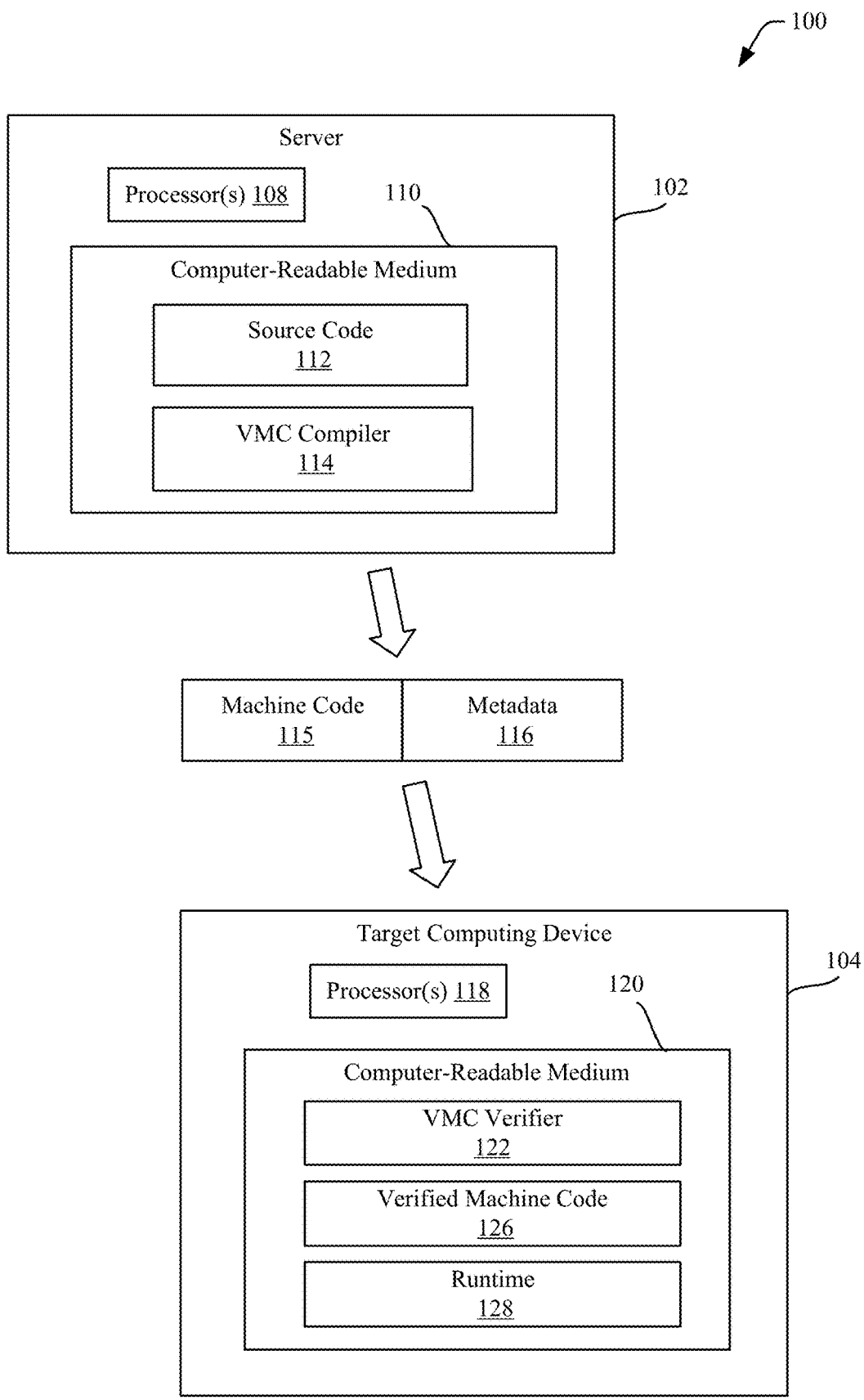
FIG. 1 illustrates an exemplary system for providing and verifying machine code according to certain aspects of the present disclosure.

Some untrusted machine code may compromise the function of a computing device by creating security exposures or disrupting the use of memory or other hardware resources by other programs, the operating system, or the processor. Such issues may arise either due to intentional acts by coders or due to inadvertent errors. In order to prevent such adverse consequences, some operating systems or processing platforms provide a sandbox for the execution of untrusted machine code. A sandbox is a process for executing the machine code using a limited, tightly-controlled set of resources. However, sandboxing may be impractical, for example, where the software in question needs to use a broader set of resources for its intended purpose.

One way to minimize the risk of running untrusted machine code without relying on sandboxing is to use software fault isolation, in which a compiler emits machine code that is structured so that a determination can be made relatively easily as to whether the machine code carries out a questionable or unsafe operation. Such machine code can include complex instruction sequences, since the technique requires the proof of safety to be contained within the machine code itself. Another way to minimize the risk of running untrusted machine code is to design a compiler to emit proof-carrying code, which is supplied with a theorem that can be used as a logical proof of safety. The theorem can be solved prior to executing the machine code to verify that the untrusted code follows safety rules established between the compiler and the computing device or operating system for which the code is being supplied. These techniques add a layer of complexity to execution of the machine code, resulting in a negative performance impact on the computing device for which the machine code is designed.

Methods and systems are disclosed herein for providing verifiable machine code that can be executed by a computing device without sandboxing and with high processing efficiency, while ensuring that the machine code can be executed safely. In one example, a compiler provides a software program including machine code, along with metadata that identifies and describes certain sections of the machine code. A verifier provided on the target computing device accesses execution safety policies and verification rules to be applied to the program. The verifier does not apply the execution safety policies to certain verifiable sections of machine code, but instead identifies the sections and uses descriptors in the metadata to apply rules for the execution of the machine code in the identified sections while allowing that code to perform operations otherwise prohibited by the execution safety policies. As one example, the verifier may prohibit jumps in execution into or out of the middle of a verifiable section, but otherwise allow jumps within a verifiable section even if the jump would violate the normal execution safety policies. As another example, the verifier may reserve registers for use by the machine code in verifiable sections to allow that machine code to save to or load from memory while preventing it from accessing registers that could cause issues with the operation of other code or the computing device. Since the metadata can be read quickly, and the machine code does not need to use complex instructions to enable fault isolation, both a high level of performance and a high level of safety can be maintained for the otherwise untrusted machine-code program.

Verifiable machine code, as an example, can be provided for use on any computing device that does not have or cannot use an operating system sandbox to mitigate the risks of running untrusted machine code. Such a computing device may instead have only an application-level sandbox. Accordingly, verifiable machine code can be provided, as an example, by a software developer for use on various devices, including a third-party computing device, ensuring that the curator or supplier of the third-party computing device can trust the machine code.

As other examples, verifiable machine code can be provided for older computing devices, computing devices with non-traditional operating systems, or computing devices that cannot easily be provided with firmware or operating system updates to mitigate security threats. If the device includes a machine-code verifier as described herein, the verifiable machine code provides an assurance of safety despite the age of the target computing device or its software assets. Examples of such computing devices, or systems with such computing devices include: accessories such as Bluetooth or wired headsets, keyboards, microphones, and pointing devices; wearable devices; building control systems; home automation systems; access control systems such as door locks, transit access systems, and transportation security systems; entertainment/media devices; climate control systems; security and surveillance systems; cameras, power systems such as public chargers, portable devices, electric vehicle charging systems; vending machines; medical devices; routers or other network elements; kiosks such as information terminals or ATMs; communication devices (public terminals or kiosks); industrial systems, public computing devices, airborne systems, spaceborne systems; and transportation systems.

I. System Overview

In exemplary embodiments described below, an example system for providing and using verifiable machine code (VMC) is shown. FIG. 1 and its description provide an overview of the system.

FIG. 1 depicts a block diagram of a system 100 for producing and running verifiable machine code according to certain embodiments. System 100 includes server 102 and a target computing device 104. Server 102 includes one or more processors 108 and a computer-readable medium 110. The server 102 may include adapters, routers, etc., for accessing network-attached data stores, a communications network, or both. Computer-readable medium 110 may include non-transitory memories or other non-transitory media, used to store computer program code instructions for executing a VMC compiler 114, and for storing or caching source code 112 for a computer program intended for use on target computing device 104. VMC compiler 114 in this example compiles source code 112 to produce machine code 115 forming a machine-code program for target computing device 104.

A compiler such as VMC compiler 114 can operate in any environment where a compiler might normally be used. For example, compilers are often run on a "build farm" that is used to generate copies of a machine-code program to transfer to user devices. A VMC compiler may also run on a stand-alone software developer's machine, rather than a server as illustrated in the example of FIG. 1. A VMC compiler can run on its own computing device, though a system can be assembled in which both the target computing device and the VMC compiler's computing device are the same computing device. A server may also be provided to store and/or distribute a machine-code program where the compiling is done on a separate computing device.

VMC compiler 114 is programmatically aware of instructions that are unsafe for the target computer system, and that are therefore prohibited by execution safety policies that are specific to the target computing device, or a family of similar devices, for example, devices running a specific operating system or using a specific processor family. VMC compiler 114 may be programmatically aware that indirect function calls, indirect jumps, loads, and stores are inherently unsafe and will generally be prohibited by execution safety policies provided on target computing device 104. However, if necessary for efficient execution of the machine-code program on target computing device 104, VMC compiler 114 programmatically can walk through the functions called by these instructions to structure the machine-code program so that such instructions are confined to identified, verifiable sections of instructions within machine code 115. VMC compiler 114 also emits metadata 116 that describes these verifiable sections of instructions to target computing device 104 so that target computing device 104 can evaluate the verifiable sections of machine code against verification rules that allow such instructions to be executed safely.

Target computing device 104 of system 100 includes one or more processors 118 and a computer-readable medium 120. Computer-readable medium 120 may include non-transitory memories or other non-transitory media, used to store computer program code instructions for executing a VMC verifier 122, and for storing verified machine code 126, which forms a copy of the machine-code program for use on target computing device 104. More details of exemplary computing devices are described below with respect to FIG. 7. The machine-code program may be for an application, a system function, a driver, etc. VMC verifier 122 in this example verifies machine code 115 for execution on target computing device 104 and stores the code for execution in the normal course of operation as verified machine code 126. VMC verifier 122 verifies the machine code by using metadata 116, which describes verifiable sections of the machine code that include instructions that violate execution safety policies. VMC verifier 122 imposes additional verification rules on these sections. Target computing device 104 may receive machine code 115 and metadata 116, as examples, through a network or from a removable storage medium such as a flash drive or optical disc.

Computer-readable medium 120 in this example also includes runtime 128. The term "runtime" refers to runtime software, which is a computer program designed to support the execution of another computer program such as an application written in a specific language or in machine-code instructions for a specific processor platform. After VMC verifier 122 verifies machine code 115 and metadata 116, runtime 128 can execute the verified code.

Server 102 can also transmit the VMC program and/or the metadata to the target computing device 104 through one or more intermediary devices. The VMC and/or the metadata may reside independently on the intermediary device until requested by or for the target computing device, or until distribution to the target computing device is triggered programmatically. For example, the VMC and/or metadata can be distributed through a distribution server, a content data network server, or an application store server. The target computing device can download files including the VMC program and/or the metadata, or such files can be pushed to the target computing device.

In some examples, execution safety policies are agreed on and programmatically understood by both the compiler and the verifier. The additional verification rules may be programmatically coded into the compiler and verifier as well, or may be stored separately in either case so that the verification rules can be updated when needed and accessed when machine code is being compiled and/or verified.

Execution safety policies may include, as examples, prohibitions on indirect calls or jumps, meaning calls can only target function prologues and jumps can only be made within a current function and must land on a valid instruction boundary. Execution safety policies may also include prohibitions on modifying certain registers, such as segment pointer registers, frame pointer registers, or registers that are pinned for a memory region base and/or size. Execution safety policies may also preclude all memory accesses that don't use a constant offset from the segment pointer or a frame pointer that falls inside a function's stack frame. Offsets may be limited to positive values within a fixed limit. Execution safety policies may also require memory access to be accomplished with zero-extends or checks, meaning memory access cannot require more than one instruction, though an exception may be required for some processor platforms. Specific instructions may also be completely off-limits.

The VMC verifier 122 can be initially designed for a specific target computing platform without being preloaded with any data or verification rules needed to evaluate verifiable sections of instructions that would typically be encountered in code emitted by an existing VMC compiler. Over time, code samples can be generated in the laboratory by a copy of VMC compiler 114, and as verifiable sections of code are rejected by the VMC verifier, the VMC verifier can be updated as appropriate until all expected verifiable code sections can be handled by the VMC verifier, at which point the VMC verifier can be deployed to target computing devices. For some platforms, there could be five or fewer kinds of verifiable sections encountered. In other platforms, there could a dozen or more, for example, in platforms where function calling conventions suggest additional function calls invoked at the beginning and/or end of called functions.

Alternatives to a system with an independent compiler and verifiers include systems where a target computing device compiles machine code itself "on-the-fly" from higher-level or scripted code or some other source code. Such a system may optionally provide just-in-time (JIT) compiling. In such an example, the VMC verifier and VMC compiler would be developed in the same manner as for a system in which these two entities are on different machines or otherwise operate independently, but both would be deployed to target computing devices.

As another alternative, tools could be provided to allow skilled developers to generate assembly language code manually and generate the needed metadata. In such an example, a compiler, per se, would not exist, but the VMC verifier can be developed and deployed to target computing devices to perform the same verification process described herein with respect to systems using VMC compilers.

II. Verifiable Machine Code Architecture

Figure 2:
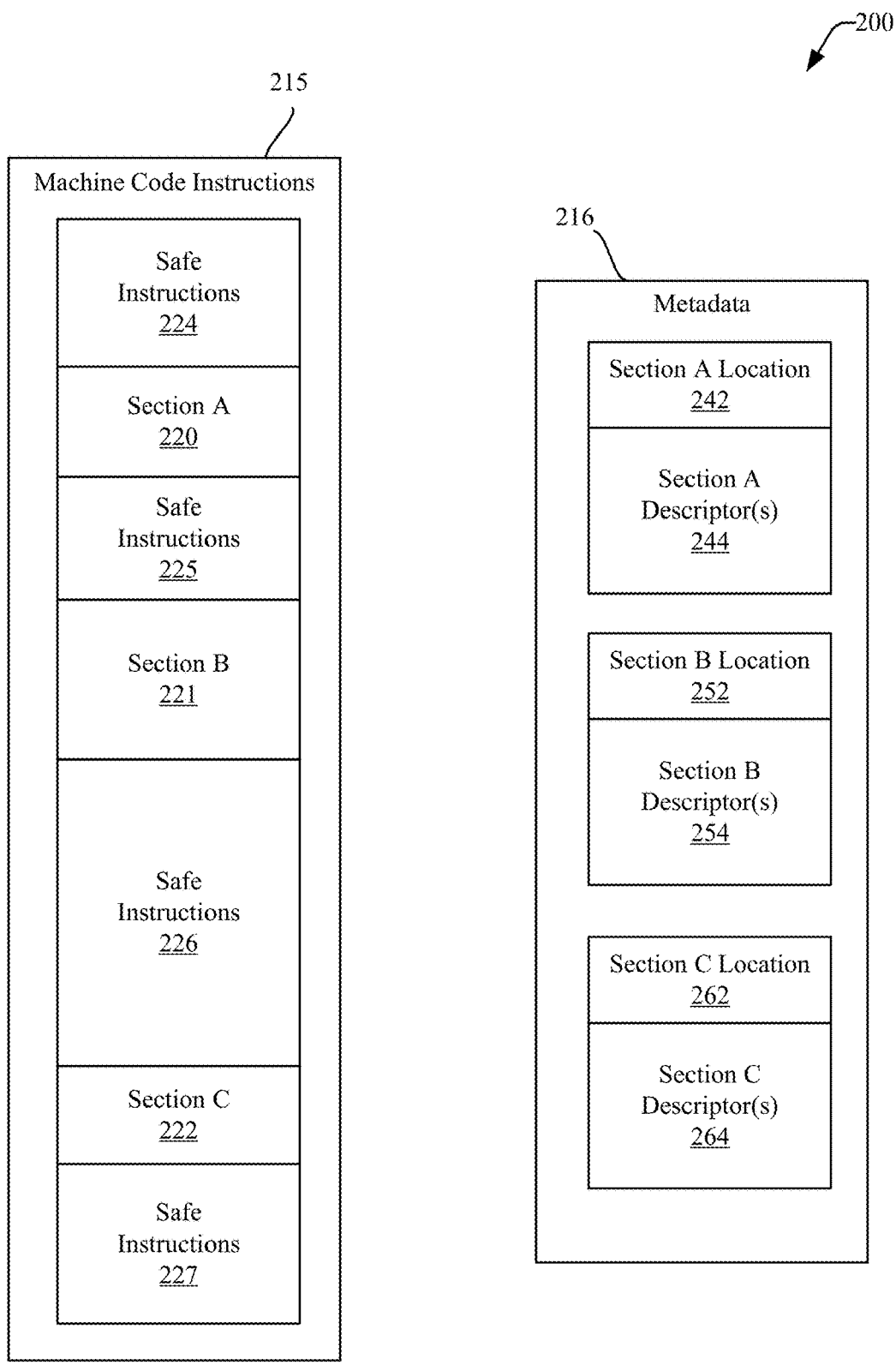
FIG. 2 illustrates an exemplary verifiable machine code architecture according to certain aspects of the present disclosure.

An example machine code architecture is described below. Such an architecture includes machine-code instructions and the metadata that describes, at least certain, identified, verifiable sections of the instructions. FIG. 2 illustrates a machine code architecture 200 including machine-code instructions 215 and metadata 216, according to some embodiments.

A. Machine Code Structure

Machine-code instructions 215 of a machine-code program for a target computing device include sections of safe instructions as well as verifiable sections of instructions that may violate execution safety policies for the target computing device. More particularly, machine-code instructions 215 include verifiable sections A, B, and C, 220-222. Safe instructions 224-227 occur outside of the verifiable sections. Execution of the machine-code instructions outside the verifiable sections can take place without any verification since execution in these areas invoke only operations that comply with execution safety policies for the target computing device. Metadata 216 does not need to include information about instructions outside of the verifiable sections of instructions, and the verifier in the target computing device does not need to spend resources evaluating instructions outside of the verifiable sections.

A verifiable section of instructions in this example includes an annotated function and a prologue at its beginning. The prologue saves designations and frame sizes for registers and includes an argument check. The prologue may also contain an argument count check if the function accesses a large number of arguments. The VMC verifier may check the argument count as part of applying verification rules to the verifiable section. A verifiable section of instructions in this example also includes at least one epilogue, although since some functions can include multiple epilogues, a verifiable section of machine code can include multiple epilogues. In some examples, epilogues must conform to the prologue in terms of frame sizes and saves.

The VMC verifier may allow memory access that requires more than one instruction that is not known to be acceptable on the relevant processor platform. These instructions would be confined to verifiable sections by the execution safety policies. In this case, a verification rule can prevent skipping a check by preventing a resulting jump from landing within a memory access region. Verifiable sections may also be used to allow instructions that use argument registers to be executed without proving that an argument for a called function is actually passed through the argument register.

B. Metadata Structure

Metadata 216 includes, for each verifiable section of machine code as discussed above, values that can be used to locate the section, and one or more descriptors. The metadata for section A includes location values 242 and descriptors 244. The metadata for section B includes location values 252 and descriptors 254. The metadata for section C includes location values 262 and descriptors 264. Location values 242 correspond to the location of section A, 220, in machine code instructions 215. Location values 252 correspond to the location of section B, 221. Location values 262 correspond to the location of section C, 222.

In one example, the location values include those that identify the beginning and end of the sequence of instructions for each section and the beginning and end correspond to the prologue and the epilogues described above. Since these sections can be identified from the metadata, the verifier can operate more efficiently because it does not need to examine all of the machine-code program to find the sections that do not follow the understood execution safety policies. Descriptors may include one or more samples of machine code that otherwise violate execution safety policies. A machine code sample may take the form of a template. A template is an enumeration of selected, recognizable machine-code instructions.

Descriptors may also include memory addresses, sizes, lengths, functions needed for the instructions, etc., any information needed to enable the VMC verifier to apply verification rules to the machine-code instructions in verifiable sections and either approve or prevent the execution of the VMC program as appropriate. The descriptors in some cases may enable to the VMC verifier to produce a copy of the instructions in a section and compare its copy with the supplied machine-code instructions as part of the verification process. The metadata for a section may also list a function's frame size and what registers are referenced, as specified in the prologue and/or epilogue of the machine code section.

III. Verifiable Machine Code Flows

In exemplary embodiments described below, a VMC compiler such as compiler 114 emits machine code along with metadata describing verifiable sections of the machine code, wherein the sections include instructions that do not comply with expectation safety policies. This process is described with respect to FIG. 3. A VMC verifier on the target comping device evaluates these sections using the metadata do determine if the machine-code program is safe to load and execute. The verification process is described with respect to FIG. 4.

A. Machine Code Generation Flow

Figure 3:
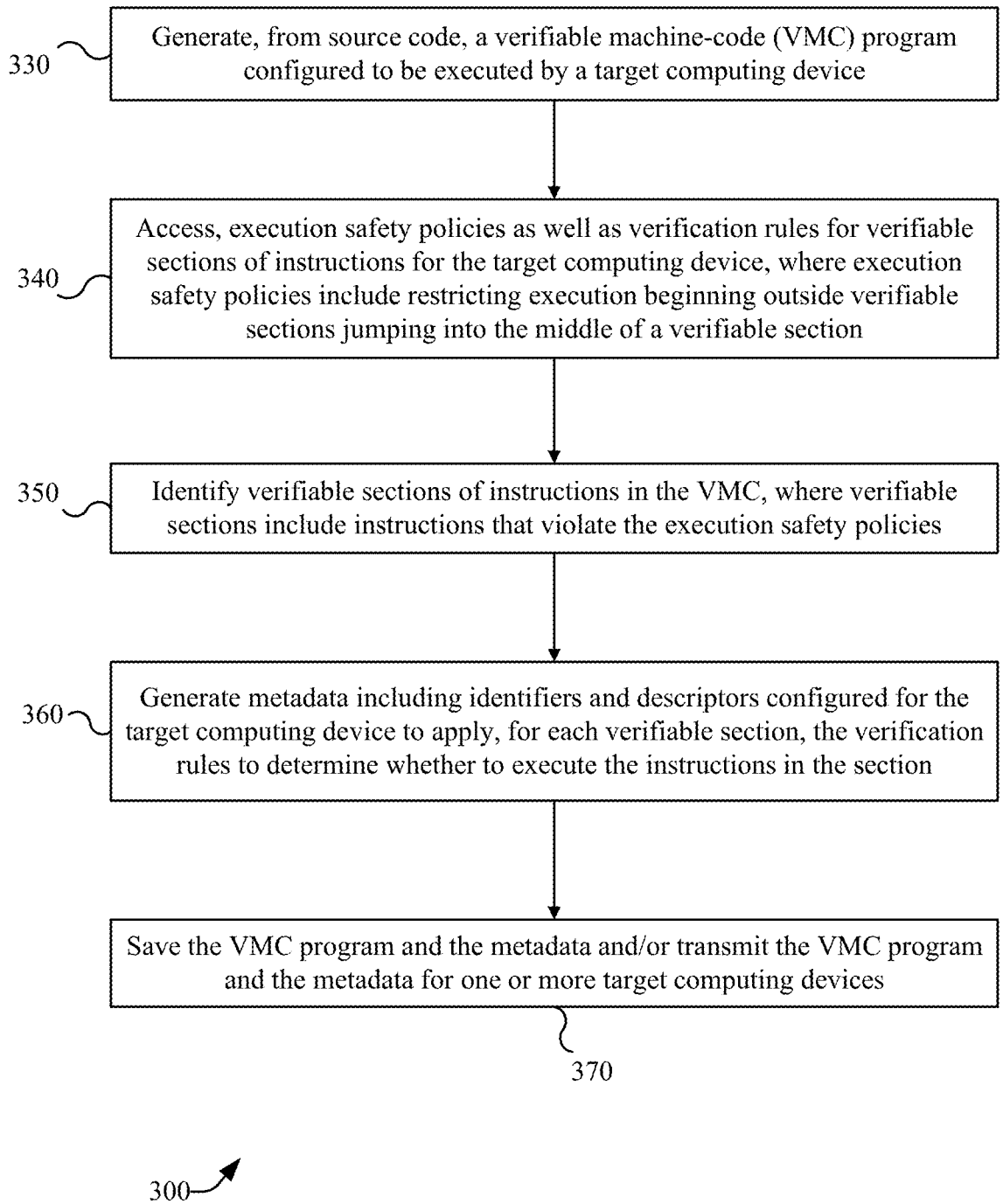
FIG. 3 illustrates an exemplary flowchart for providing machine code according to certain aspects of the present disclosure.

Processes for providing verifiable machine code and the accompanying metadata for a target computing device are discussed below with respect to FIG. 3, which is a flowchart of an example process 300 associated with such techniques. In some implementations, one or more process blocks of FIG. 3 may be performed by a computing device such as a server (e.g., server 102 of FIG. 1). Additionally, or alternatively, one or more process blocks of FIG. 4 may be performed by one or more components of this devices, such as processor 108 or computer-readable medium 110.

At 330, the computing device generates the verifiable machine code (VMC) program configured to be executed by a target computing device. For example, VMC compiler 114 in server 102, the source computing device, may generate machine code 115. In this example, VMC compiler 114 generates machine code 115 by compiling source code 112.

At 340, the computing device accesses execution safety policies as well as verification rules for the verifiable sections of instructions in the machine code program. In this example, the execution safety policies can include restricting execution beginning outside verifiable sections of the program from jumping into the middle of the verifiable section.

At 350, the source computing device (server 102 in this example) identifies the verifiable sections of instructions in the VMC program. These verifiable sections include instructions that violate the execution safety policies as inherently understood by both the compiler and the verifier on the target computing device.

At 360, the computing device generates the metadata, including locations and descriptors configured for the target computing device to be able to apply the verification rules to verifiable sections of instructions. The verification rules allow the VMC verifier 122 in a target computing device such as target computing device 104 to determine whether to execute the instructions in the section. For example, the verification rules may be designed to ensure that writes performed by verifiable machine code are restricted to certain pre-selected registers, wherein writes are normally not permitted at all by the execution safety policies. As another example, the verification rules may be designed to restrict the modification of certain function tables or prohibit functions that exceed the length of a stored function table, while allowing other function tables to be modified, wherein modifying any function table might be prohibited by the execution safety policies.

At 370 the source computing device saves the VMC program and the metadata, and/or transmits the VMC program and metadata to one or more target computing devices.

The VMC program and the metadata can be saved on the server that generated them, saved to a different server, or transmitted to one or more target devices. Files including the VMC program in the metadata may be transmitted directly or through intermediary devices, as previously discussed.

In some examples, the VMC compiler can generate machine-code programs for processing platforms other than the one on which the VMC compiler runs. For example, the compiler may run on an X86 processor but generate VMC programs to run on an ARM processor or vice versa.

In some systems, for example, where network communication is maintained between the computing device running the compiler and the computing device running the verifier during deployment of the VMC program, the VMC compiler can connect to the VMC verifier. The source computing device or system compiling the VMC program for target computing devices can then obtain immediate feedback as to the verification status of a VMC program being distributed to a given target computing device.

B. Machine Code Verification Flow

Figure 4:
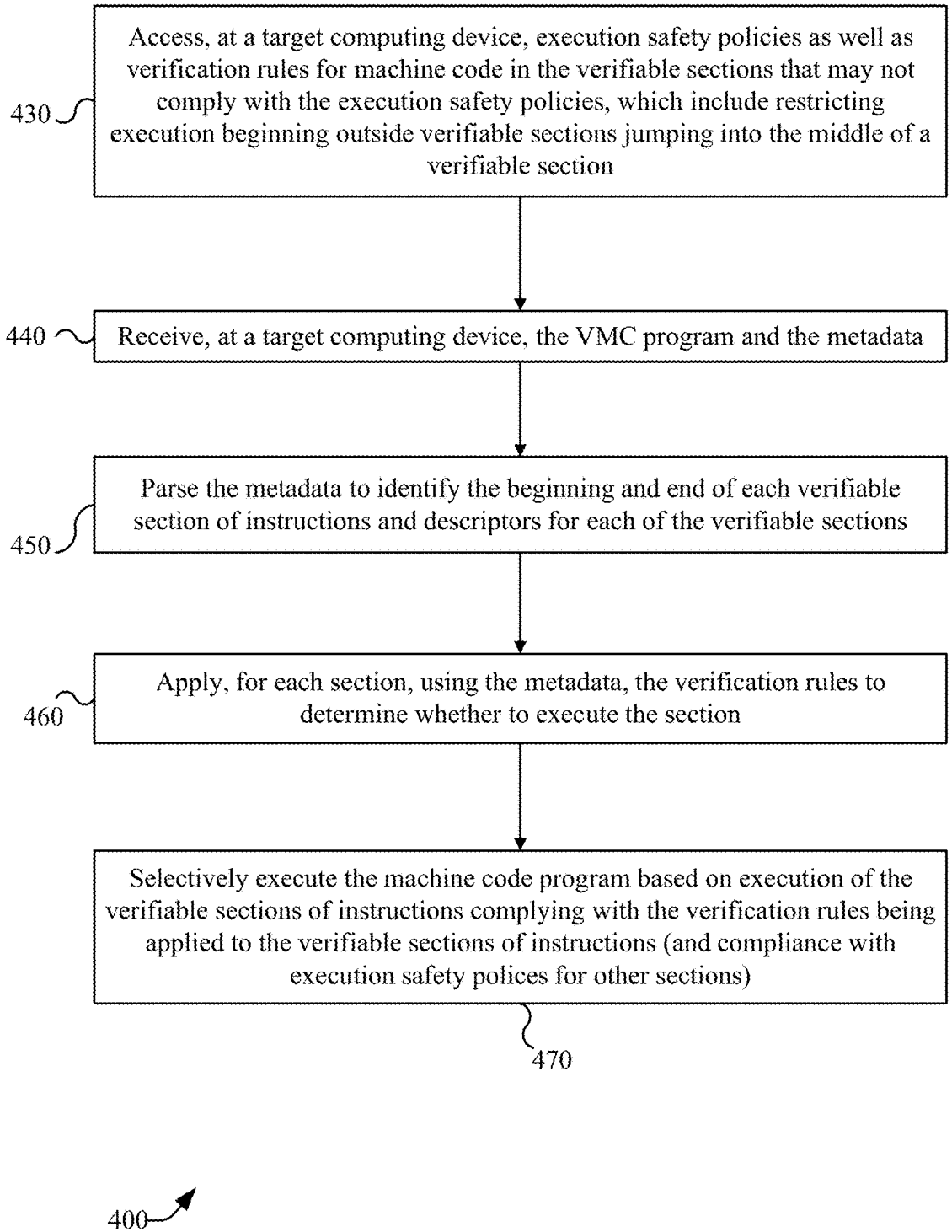
FIG. 4 illustrates an exemplary flowchart for verifying machine code according to certain aspects of the present disclosure.

Processes for verifying a VMC program for execution on a target computing device will be discussed below with respect to FIG. 4, which is a flowchart of an example process 400 associated with these techniques. In some implementations, one or more process blocks of FIG. 4 may be performed by a computing device (e.g., computing device 104 of FIG. 1, computing device 502 of FIG. 5, or computing device 700 discussed below with respect to FIG. 7). Additionally, or alternatively, one or more process blocks of FIG. 4 may be performed by one or more components of these devices, such as processor 118, processing system 702, computer-readable medium 120, storage subsystem 704, or operating system 732.

At 430, VMC verifier 122 on target computing device 104 accesses execution safety policies as well as verification rules for the machine code in the verifiable sections. The machine code instructions in verifiable sections may violate, or may not comply with, the understood execution safety policies. In some examples, an execution safety policy that cannot be violated is established to prohibit execution to jump to a position within a verifiable section, that is, it prohibits execution of a verifiable section of instructions from a location other than the beginning of the verifiable section. At 440, the target computing device receives the VMC program and the metadata. In some implementations, a target computing device may not access the execution safety polices and verification rules until after it receives the VMC program and/or the metadata.

At 450, processor 118 in target computing device 104 parses the metadata to identify the beginning and end of each verifiable section of instructions and descriptors for each of the verifiable sections. These descriptors may identify indirect function calls, indirect jumps, loads, and/or stores that result from executing the machine-code instructions in verifiable sections. In some examples, the descriptors may include templates for and/or samples of the machine code in question.

At 460, VMC verifier 122 applies verification rules to the machine code in the verifiable sections. The verification rules may include, as examples, restricting rights to preselected registers, restricting modifications to function tables, and restricting functions that exceed the length of a function table. A function table may be maintained as part of the runtime on target computing device 104. The runtime may create tables of functions as needed to execute machine-code programs such as applications. A table of functions may be copied into the metadata as part of the descriptor for a verifiable section of machine code. These rules may also apply to a global function table including integer values and indices to the integer values. The VMC verifier applies the verification rules as specifically needed for each identified, verifiable section to selectively allow or cause the machine-code program.

At 470, the program (e.g., all or certain sections) can be selectively executed based on the at least one verifiable section satisfying the plurality of verification rules. For example, if a code sample or a template within the descriptor of a verifiable section refers to an specified value of an offset, the verifier with check the specific offset called out in or resulting from the machine-code instructions themselves to verify that those instructions will not result in an unsafe load of the VMC program. A determination that the program is safe to execute can also be based on execution outside of the verifiable sections complying with the standard execution safety policies.

The verifier can check machine-code instructions using a machine code sequence written into in the descriptor in the metadata. Alternatively, the verifier can take the information provided in a descriptor and generate a code sequence to compare to the compiler-emitted code in the verifiable section. In this case, the applied verification rule is one that requires that the verifier-generated machine code for the verifiable section of instructions match the compiler-supplied machine code for the section, either identically, or with substantial identity, as least insofar as instructions that are responsible for violating the execution safety policies. If the instructions do not match, the verifiable section cannot be determined to comply with the verification rules and the target computing device will not permit the VMC program, or at least the relevant portion of the VMC program to be executed. Otherwise, the program can be executed as complying with both the inherently understood execution safety policies for the target computing device and the verification rules being applied.

As an example, some verifiable machine code sections of a VMC program may include load instructions, for loading data with a specific offset relative to a base memory address. In this example, the VMC verifier can, based on the information in the metadata, including memory addresses, sizes, lengths, and knowledge of the load function, generate its own copy of the machine code expected from the compiler for this section, essentially, what the verifier "thinks" it should see for this section in terms of these parameters for the instruction. The verifier can then directly compare its machine code to the machine code instructions in the verifiable section to determine if the two sets of instructions match, and verify the machine code for that section only when the two sets match.

As an alternative to generating its own code, the VMC verifier can be designed to apply a rule for verification of, for example, a load instruction, by incorporating reserved registers of specified lengths for loads. If a load instruction would cause a branch to a memory range with a length greater than or equal to a reserved register's length, the load instruction cannot be verified and the VMC program is not executed.

In some implementations, the verifier can be pre-loaded with details of machine code that might appear in VMC program sections provided by the VMC compiler as part of the development process for a VMC compiler and VMC verifier for a given target computing device or a type of target computing devices. This pre-loaded code can then be used for any needed comparison-based verification.

IV. Verification Rule Example

Figure 5:
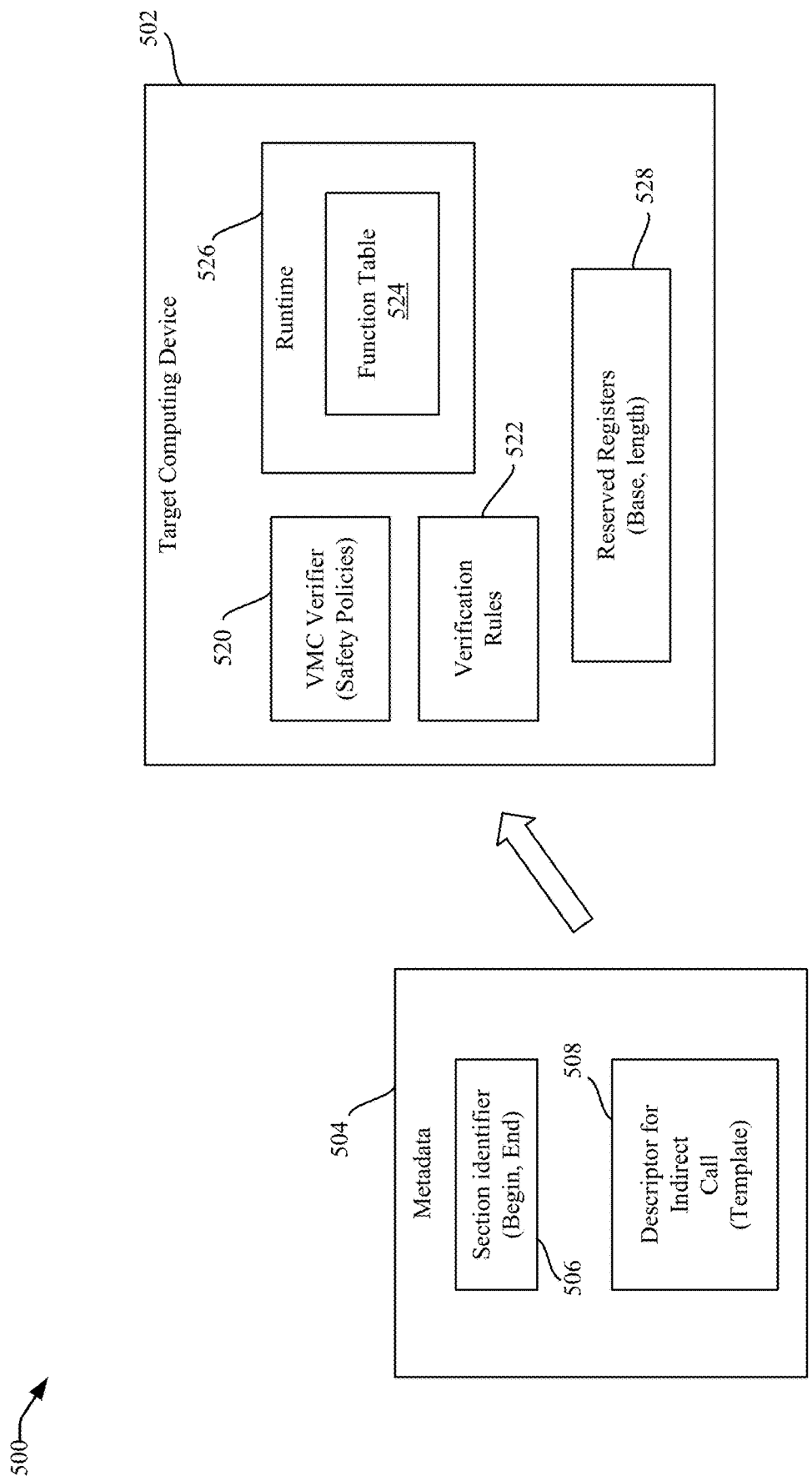
FIG. 5 is a block diagram showing the relationship between the metadata for a specific, verifiable section of instructions that includes an indirect call and the entities on a target computing device according to certain aspects of the present disclosure.
Figure 6:
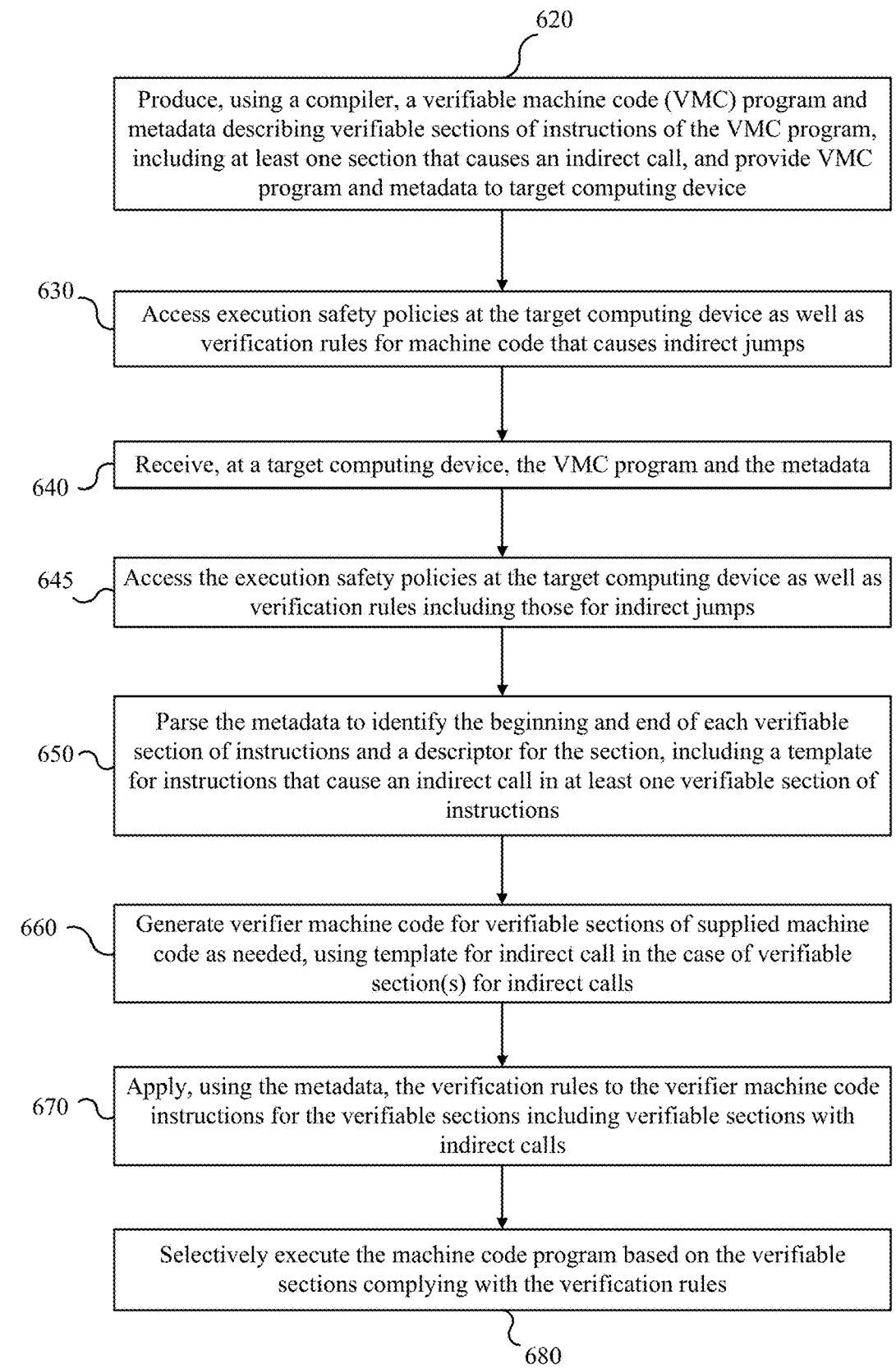
FIG. 6 illustrates an exemplary flowchart for providing and verifying machine code, which includes indirect function calls according to certain aspects of the present disclosure.

FIG. 5 and FIG. 6 illustrate how an indirect function call, or "indirect call," which in some examples violates execution safety policies, is verified in certain embodiments. FIG. 5 shows how information in the metadata for a specific, verifiable section of instructions that includes an indirect call is used by the verifier to apply the verification rule on the target computing device. FIG. 6 is a flowchart for the process of verifying an indirect function call.

A. Verification Rule Implementation

FIG. 5 is a block diagram showing a relationship 500 between entities on a target computing device 502 and a metadata entry 504 that describes an indirect call. Metadata entry 504 includes a machine code section identifier 506, which provides a beginning and end value for the section of machine-code instructions to which the metadata refers. The beginning value corresponds to the location of the prologue and the ending value corresponds to the location of the last epilog in the section of machine-code instructions. Metadata entry 504 also includes a descriptor 508 for the indirect call. The descriptor 508 can include a template for machine code instructions that perform an indirect call. More specifically, the template can include a recognizable sequence of instructions that cause an indirect call in the specific type of target computing device for which the VMC program is designed. This sequence has been programmatically incorporated into both the compiler and the verifier. The descriptor may include, as examples, a table of functions that has been copied into the metadata, identification of reserved registers that need to be used by the functions, or memory offsets and/or sizes of blocks of memory to be used by the functions.

Target computing device 502 of FIG. 5 includes VMC verifier 520, which accesses verification rules 522, and recognizes the sequence used by the compiler. The VMC verifier is programmed with general execution safety policies. Function table 524 is part of runtime 526 installed on target computing device 502. The runtime supports the execution of the VMC program on the processing platform of target computing device 502. In the example of FIG. 5, runtime 526 supports machine code using the instruction set for the processing platform of the target computing device. The runtime is responsible for setting up the environment in which the VMC program runs. For example, the runtime may allocate executable memory pages for the code and allocate a memory region for fast memory and/or checked memory. In one example, fast memory is specified by a fixed, virtual reservation of memory, and checked memory can be any memory that provides explicit data checking. The runtime may also pin the VMC program to a memory region's base and/or size for reference to specific registers.

Function table 524 in this example includes the function used by the indirect call to be verified based on metadata entry 504. Function table 524 may be a global function table for the processing platform of target computing device 502. Target computing device 502 also includes designations 528 of reserved registers, which include registers for base memory location values and lengths used by table functions. VMC verifier will verify, using metadata entry 504, that the indirect function call described therein does not use any of these registers or otherwise interfere with the use of function table 524.

B. Verification Rule Flow

FIG. 6 is a flowchart of an example process 600 associated with verifying an indirect function call. FIG. 6 illustrates some aspects that are also shown in FIG. 3 and FIG. 4. In some implementations, one or more process blocks of FIG. 6 may be performed by source or target computing device (e.g., computing device 102 of FIG. 1, computing device 104 of FIG. 1, computing device 502 of FIG. 5, or computing device 700 discussed below with respect to FIG. 7). Additionally, or alternatively, one or more process blocks of FIG. 6 may be performed by one or more components of these devices, such as processors 108 or 118, processing system 702, computer-readable medium 110, computer-readable medium 120, storage subsystem 704, or operating system 732.

At 620, a source computing device produces, using a compiler, a VMC program and metadata describing verifiable sections of instructions within the VMC program. At least one of these sections of instructions includes code that causes an indirect call.

At 630, the source computing device accesses execution safety policies for the target computing device as well as verification rules for the machine code for the target computing device. The verification rules include at least one verification rule for machine code the causes indirect calls. These rules may include restricting rights to preselected registers, restricting modification of the function table, for example, function table 524 maintained as part of runtime 526, and/or restricting the use of functions that exceed function table length. The source computing device uses the policies and rules to produce the metadata. The computing device transmits or saves the VMC program and the metadata.

At 640, the target computing device receives the VMC program and the metadata. As examples, the VMC program and/or the metadata can be received through a network, or from a removable storage medium such as a flash drive or optical disc. The VMC program and/or the metadata can also be received through a distribution server or some other intermediary device.

At 645, the target computing device accesses the execution safety policies and verification rules 522. The execution safety policies may be programmatically embedded in the VMC verifier 520.

At 650, the target computing device parses the metadata to identify the beginning and end of each verifiable section of instructions and a descriptor for each section. The metadata for any section that causes an indirect call includes a template for the machine code in that section. At 660, the target computing device generates its own machine code for verifiable sections of supplied machine code as needed. In the case of a section that causes an indirect call, the template is used to generate and the VMC verifier's own copy of machine code.

At 670, verification rules 522 are applied for the verifiable machine code sections using the metadata, including any verifiable sections with indirect calls. For example, the verification rules 522 can be applied to the machine code section described in metadata entry 504. The machine code in this section is identified by descriptor 508 as invoking an indirect call.

At block 680, the target computing device selectively executes the machine code program based on the verifiable sections complying with the verification rules. Machine code outside the verifiable sections may necessarily comply with the execution safety policies included in VMC verifier 520.

The verification rules include, in the case of indirect calls, prohibiting the code from writing to certain registers, modifying a function table maintained by the runtime, or using functions that exceed function table length. However, the code can provide its own scratch register for writes of information that is consumed in executing the code. Where a function called by the verifiable machine code exceeds the relevant table length, the VMC verifier compares the function called to the length the function in the relevant table and rejects the section of machine code if the length is not consistent with the function. In some implementations, the VMC verifier can then load the function from the table maintained by the runtime rather than use the function specified in the compiled machine code in order to execute the VMC program, since the table can be treated as a trusted register.

V. Exemplary Computing Devices

Figure 7:
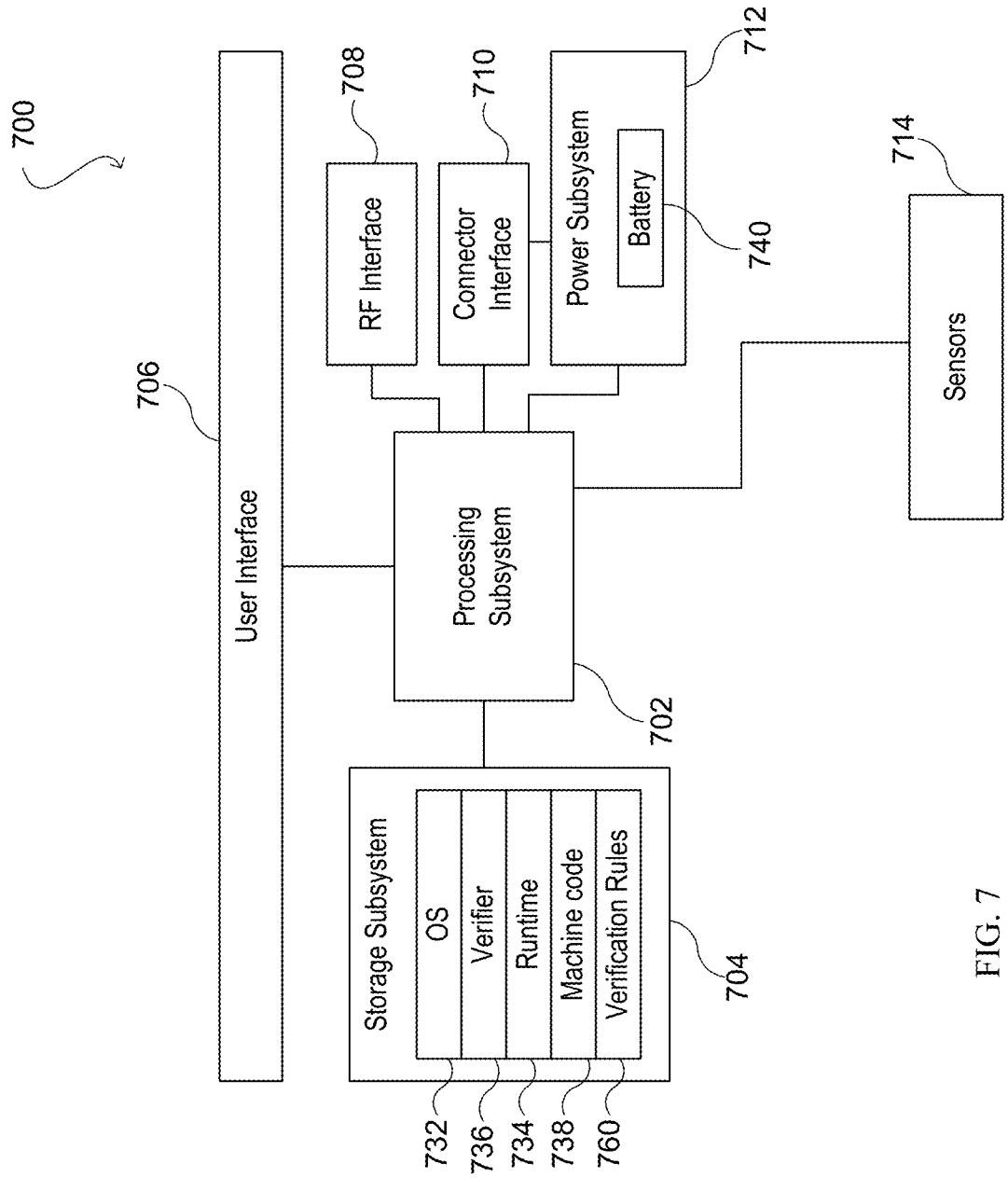
FIG. 7 is a block diagram for an exemplary computing device according to certain aspects of the present disclosure.

FIG. 7 is a block diagram of a computing device 700 according to certain embodiments. The computing device 700 can serve as a target computing device as previously described. In some examples, the target computing device is one on which untrusted machine code represents high risk, for example, a medical device. However, computing device 700 may be implemented as any wearable or implantable device, a mobile device, or server, or a desktop/notebook computer system. A computing device like computing device 700 could also include a compiler and serve as a source computing device.

Computing device 700 can include processing subsystem 702, storage subsystem 704, user interface 706, RF interface 708, connector interface 710, power subsystem 712, and sensors 714. Computing device 700 can also include other components (not explicitly shown).

Storage subsystem 704 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 704 can store media items such as audio files, video files, image or artwork files; information about a user's contacts (names, addresses, phone numbers, etc.); information about a user's scheduled appointments and events; notes; and/or other types of information, examples of which are described below. In some embodiments, storage subsystem 704 can also store one or more application programs to be executed by processing subsystem 702 (e.g., video game programs, personal information management programs, media playback programs, interface programs associated with particular host devices and/or host device functionalities, etc.).

User interface 706 can include any combination of input and output devices. A user can operate input devices of user interface 706 to invoke the functionality of computing device 700 and can view, hear, and/or otherwise experience output from computing device 700 via output devices of user interface 706. In the case of an implanted medical device, the user interface may not be directly wired to the other components, may only provide output function, or may not exist at all. Otherwise, examples of output devices include a display speakers and a haptic output generator.

Computing device 700 may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

An alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

Examples of input devices include a microphone, a touch sensor, or a camera. A microphone can include any device that converts sound waves into electronic signals. A touch sensor can include, e.g., a capacitive sensor array with the ability to localize contacts to a particular point or region on the surface of the sensor and in some instances, the ability to distinguish multiple simultaneous contacts. In some embodiments, a touch sensor can be overlaid over s display to provide a touchscreen interface, and processing subsystem 702 can translate touch events (including taps and/or other gestures made with one or more contacts) into specific user inputs depending on what is currently displayed on a display. In some embodiments, a touch sensor can also determine a location of a touch on a screen. A touch sensor may be incorporated into or on the display stack in order to determine a location of a touch. The touch sensor may be self-capacitive in certain embodiments, mutual-capacitive in others, or a combination thereof.

A display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments. In some embodiments, user interface 706 can provide output to and/or receive input from an auxiliary device such as a headset.

Processing subsystem 702 can be implemented as any electronic device capable of processing, receiving, or transmitting data or instructions. Processing subsystem 702 can include one or more integrated circuits. For example, processing subsystem 702 may include one or more of: one or more single core or multi core microprocessors or microcontrollers, a central processing unit (CPU), an application-specific integrated circuit (ASIC), a digital signal processor (DSP), or additional or combinations of such devices. In operation, processing subsystem 702 can control the operation of computing device 700. In various embodiments, processing subsystem 702 can execute a variety of programs in response to program code and can maintain multiple concurrently executing programs or processes. At any given time, some or all of the program code to be executed can be resident in processing subsystem 702 and/or in storage media such as storage subsystem 704.

Through suitable programming, processing subsystem 702 can provide various functionality for computing device 700. For example, in some embodiments, processing subsystem 702 can execute an operating system (OS) 732 and various applications. In some embodiments, computing device 700 includes runtime 734 and VMC verifier 736, which provides the verification of newly provided or newly updated untrusted machine code programs as previously discussed. Machine code 738 for such programs may be cached in the storage subsystem 704 while being verified according to verification rules 760 and then stored to be run in the normal course. VMC verifier 736 may make use of verification rules 760 in verifying machine code 738. VMC verifier 736 verifies the machine code by using metadata, which describes verifiable sections of the machine code that include instructions that violate execution safety policies. VMC verifier 736 imposes additional verification rules on these sections. If computing device 700 served as a source computing device, storage subsystem 704 would additionally, or alternatively include a compiler.

RF (radio frequency) interface 708 can allow computing device 700 to communicate wirelessly with various host devices. RF interface 708 can include RF transceiver components such as an antenna and supporting circuitry to enable data communication over a wireless medium, e.g., using Wi Fi (IEEE 802.11 family standards), Bluetooth® (a family of standards promulgated by Bluetooth SIG, Inc.), or other protocols for wireless data communication. RF interface 708 can be implemented using a combination of hardware (e.g., driver circuits, antennas, modulators/demodulators, encoders/decoders, and other analog and/or digital signal processing circuits) and software components. In some embodiments, RF interface 708 can provide near field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 708.

Connector interface 710 can allow computing device 700 to communicate with various other devices via a wired communication path, e.g., using Universal Serial Bus (USB), universal asynchronous receiver/transmitter (UART), or other protocols for wired data communication. In some examples, an untrusted machine-code program may be received from a USB flash drive that through USB. In some examples, connector interface 710 can provide a power port, allowing computing device 700 to receive power, e.g., to charge an internal battery. For example, connector interface 710 can include a connector such as a mini USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which may be transmitted to or from a host device in analog and/or digital formats.

Sensors 714 can include various electronic, mechanical, electromechanical, optical, or other devices that provide information related to external conditions around computing device 700. Sensors 714 in some embodiments can provide digital signals to processing subsystem 702, e.g., on a streaming basis or in response to polling by processing subsystem 702 as desired. Any type and combination of sensors can be used; examples include an accelerometer, a magnetometer, a gyroscope sensor, and a GPS receiver.

In the case of a wearable computing device, some sensors can provide information about the location and/or motion of computing device 700. For example, an accelerometer can sense acceleration (relative to freefall) along one or more axes, e.g., using piezoelectric or other components in conjunction with associated electronics to produce a signal. A magnetometer can sense an ambient magnetic field (e.g., Earth's magnetic field) and generate a corresponding electrical signal, which can be interpreted as a compass direction. A gyroscope sensor can sense rotational motion in one or more directions, e.g., using one or more MEMS (micro electro mechanical systems) gyroscopes and related control and sensing circuitry. A GPS receiver can determine location based on signals received from GPS satellites. Other sensors can also be included in addition to or instead of these examples.

In the case where computing device 700 is a medical device, sensors 714 may include biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. In some embodiments, the device may also measure blood pressure, ultraviolet exposure, etc. Depending on the sensors incorporated into or associated with the computing device, a variety of user characteristics may be measured and/or estimated, thereby permitting different health information to be provided to a user. In some examples, the sensed biometric information may be used to generate alerts on computing device 700 or on other devices by using RF interface 708 or connector interface 710.

Power subsystem 712 can provide power and power management capabilities for computing device 700. For example, power subsystem 712 can include a battery 740 (e.g., a rechargeable battery) and associated circuitry to distribute power from battery 740 to other components of computing device 700 that require electrical power. In some embodiments, power subsystem 712 can also include circuitry operable to charge battery 740, e.g., when connector interface 710 is connected to a power source. In some embodiments, power subsystem 712 can include a "wireless" charger, such as an inductive charger, to charge battery 740 without relying on connector interface 710. An inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes. In some embodiments, power subsystem 712 can also include other power sources, such as a solar cell or AC power supply, in addition to or instead of battery 740.

In some embodiments, control functions of power subsystem 712 can be implemented using programmable or controllable circuits operating in response to control signals generated by processing subsystem 702 in response to program code executing thereon. New or updated machine code for these functions may be verified by VMC verifier 736 before being put into use. An untrusted machine-code program can be a program that provides basic function to the target computing device, or the untrusted machine-code program can be for a more visible, user application. It will be appreciated that computing device 700 is illustrative and that variations and modifications are possible.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

What is claimed is:

1. A method comprising performing, by a target computing device:
   accessing a plurality of execution safety policies and a plurality of verification rules;
   receiving a program and metadata, wherein the program includes safe instructions and verifiable sections of instructions, and wherein the metadata is usable to identify at least one verifiable section of instructions within the program as received by the target computing device and whose operation is to be verified;
   identifying, using the metadata, sections of instructions that violate at least one of the execution safety policies, wherein the at least one verifiable section violates an execution safety policy restricting execution outside of the at least one verifiable section from jumping into a verifiable section;
   for each of the at least one verifiable sections:
      applying, using the metadata, one or more of the verification rules to the verifiable section of instructions to determine whether to execute the verifiable section despite violating at least one of the execution safety policies; and
   executing the program as received by the target computing device based on the at least one verifiable section satisfying the plurality of verification rules.

2. The method of claim 1, wherein the at least one verifiable section of instructions includes at least one of an indirect call, and indirect jump, a load, or a store.

3. The method of claim 1, wherein the metadata comprises:
   an identification of a beginning and end of the at least one verifiable section of instructions; and
   a descriptor for the at least one verifiable section of instructions.

4. The method of claim 3, wherein the descriptor for the at least one verifiable section of instructions comprises a template for an indirect call.

5. The method of claim 1, wherein the plurality of verification rules comprises:
   restricting writes to pre-selected registers;
   restricting modification of a function table; and
   restricting functions that exceed a length of the function table.

6. The method of claim 5, wherein the function table is stored as a portion of a runtime for execution of the program on the target computing device.

7. The method of claim 1, wherein applying, using the metadata, one or more of the verification rules to the verifiable section of instructions further comprises:
   generating, using the metadata, machine code corresponding to the verifiable section of instructions; and
   comparing the machine code to the verifiable section of instructions to establish at least substantial identity between the machine code and the verifiable section of instructions.

8. A non-transitory computer-readable medium storing a plurality of instructions that, when executed by one or more processors of a target computing device, causes the one or more processors to:
   access a plurality of execution safety policies and a plurality of verification rules;
   receive a program and metadata, wherein the program includes safe instructions and verifiable sections of instructions, and wherein the metadata is usable to identify at least one verifiable section of instructions within the program as received by the target computing device and whose operation is to be verified;
   identify, using the metadata, sections of instructions that violate at least one of the execution safety policies, wherein the at least one verifiable section violates an execution safety policy restricting execution outside of the at least one verifiable section from jumping into a verifiable section;
   for each of the at least one verifiable section:
   apply, using the metadata, one or more of the verification rules to the verifiable section of instructions to determine whether to execute the verifiable section despite violating at least one of the execution safety policies;
   and selectively execute the program as received by the target computing device based on the at least one verifiable section satisfying the plurality of verification rules.

9. The non-transitory computer-readable medium of claim 8, wherein the at least one verifiable section of instructions includes at least one of an indirect call, and indirect jump, a load, or a store.

10. The non-transitory computer-readable medium of claim 8, wherein the metadata comprises:
   an identification of a beginning and end of the at least one verifiable section of instructions; and
   a descriptor for the at least one verifiable section of instructions.

11. The non-transitory computer-readable medium of claim 8, wherein the plurality of verification rules comprises:
restricting writes to pre-selected registers;
restricting modification of a function table; and
restricting functions that exceed a length of the function table.

12. The non-transitory computer-readable medium of claim 8, wherein the instructions to apply, using the metadata, one or more of the verification rules to the verifiable section of instructions further comprise instructions that:
generate, using the metadata, machine code corresponding to the verifiable section of instructions; and
compare the machine code to the verifiable section of instructions to establish at least substantial identity between the machine code and the verifiable section of instructions.

13. A target computing device comprising:
one or more memories; and
one or more processors communicatively coupled to the one or more memories and configured to execute instructions stored in the one or more memories for performing operations of:
accessing a plurality of execution safety policies and a plurality of verification rules;
receiving a program and metadata, wherein the program includes safe instructions and verifiable sections of instructions, and wherein the metadata is usable to identify at least one verifiable section of instructions within the program as received by the target computing device and whose operation is to be verified;
identifying, using the metadata, sections of instructions that violate at least one of the execution safety policies, wherein the at least one verifiable section violates an execution safety policy restricting execution outside of the at least one verifiable section from jumping into a verifiable section;
for each of the at least one verifiable section:
apply, using the metadata, one or more of the verification rules to the verifiable section of instructions to determine whether to execute the verifiable section despite violating at least one of the execution safety policies;
and selectively execute the program as received by the target computing device based on the at least one verifiable section satisfying the plurality of verification rules.

14. The target computing device of claim 13, wherein the at least one verifiable section of instructions includes at least one of an indirect call, and indirect jump, a load, or a store.

15. The target computing device of claim 13, wherein the metadata comprises:
an identification of a beginning and end of the at least one verifiable section of instructions; and
a descriptor for the at least one verifiable section of instructions.

16. The target computing device of claim 13, wherein the plurality of verification rules comprises:
restricting writes to pre-selected registers;
restricting modification of a function table; and
restricting functions that exceed a length of the function table.

17. The target computing device of claim 13, wherein the instructions to apply, using the metadata, one or more of the verification rules to the verifiable section of instructions further comprise instructions for performing the operations of:
generating, using the metadata, machine code corresponding to the verifiable section of instructions; and
comparing the machine code to the verifiable section of instructions to establish at least substantial identity between the machine code and the verifiable section of instructions.

* * * * *